US011360309B2

(12) United States Patent
Goupil et al.

(10) Patent No.: US 11,360,309 B2
(45) Date of Patent: Jun. 14, 2022

(54) HIGH SPEED HOT SHOE

(71) Applicant: Wilcox Industries Corp., Newington, NH (US)

(72) Inventors: Dominic R. Goupil, Kittery, ME (US); Ned A. Dalzell, Portsmouth, NH (US)

(73) Assignee: Wilcox Industries Corp., Newington, NH (US)

( * ) Notice: Subject to any disclaimer, the term of this patent is extended or adjusted under 35 U.S.C. 154(b) by 181 days.

(21) Appl. No.: 16/830,688

(22) Filed: Mar. 26, 2020

(65) Prior Publication Data
US 2020/0225488 A1   Jul. 16, 2020

Related U.S. Application Data

(63) Continuation-in-part of application No. 16/441,608, filed on Jun. 14, 2019, now Pat. No. 10,886,646.
(Continued)

(51) Int. Cl.
*H01R 12/70* (2011.01)
*H01R 12/71* (2011.01)
(Continued)

(52) U.S. Cl.
CPC ..... *G02B 27/0172* (2013.01); *H01R 12/7082* (2013.01); *H01R 12/714* (2013.01);
(Continued)

(58) Field of Classification Search
CPC .. A42B 3/04; H01R 12/7082; G02B 27/0172; G02B 2027/0136; G02B 2027/0138
See application file for complete search history.

(56) References Cited

U.S. PATENT DOCUMENTS

| 4,666,276 A | 5/1987 | Chan |
| 7,726,994 B1 | 6/2010 | Willey |
| (Continued) | | |

FOREIGN PATENT DOCUMENTS

| EP | 3410192 A1 | 12/2018 |
| EP | 3582331 A1 | 12/2019 |
| (Continued) | | |

OTHER PUBLICATIONS

European Search Report and Written Opinion received in EP20165707.9 dated Aug. 14, 2020.
(Continued)

*Primary Examiner* — Briggitte R. Hammond
(74) *Attorney, Agent, or Firm* — McLane Middleton, Professional Association

(57) ABSTRACT

An interface system for a helmet mounting system comprises a helmet strap assembly. A helmet shroud includes a shroud interface assembly configured to mate with a first hot shoe of a helmet mount assembly. The shroud interface assembly comprises a high speed data interface configured to be electrically coupled to the first hot shoe when the shroud interface assembly is coupled with the first hot shoe. A battery mount assembly comprises a second hot shoe portion which is configured to mate with a hot shoe receiver of a battery pack. The second hot shoe portion comprises a high speed data interface which is configured to be electrically coupled to high speed contacts on the hot shoe receiver of the battery pack when the second hot shoe portion is coupled with the hot shoe receiver of a battery pack.

16 Claims, 19 Drawing Sheets

Related U.S. Application Data

(60) Provisional application No. 62/825,480, filed on Mar. 28, 2019, provisional application No. 62/685,180, filed on Jun. 14, 2018.

(51) Int. Cl.
*A42B 3/04* (2006.01)
*G02B 27/01* (2006.01)

(52) U.S. Cl.
CPC ........ *A42B 3/04* (2013.01); *G02B 2027/0136* (2013.01); *G02B 2027/0138* (2013.01)

(56) References Cited

U.S. PATENT DOCUMENTS

| | | | |
|---|---|---|---|
| 7,783,188 B2 | 8/2010 | Clark | |
| 8,531,592 B2 | 9/2013 | Teetzel et al. | |
| 8,596,881 B2 | 12/2013 | Umeno | |
| 8,908,389 B2 | 12/2014 | Teetzel et al. | |
| 8,984,665 B2 | 3/2015 | Celona et al. | |
| 9,031,400 B2 | 5/2015 | Bae | |
| 9,203,063 B2 | 12/2015 | Celona et al. | |
| 9,532,608 B2 | 1/2017 | Tsang et al. | |
| 10,113,837 B2 | 10/2018 | Masarik et al. | |
| 10,261,398 B2 | 4/2019 | Kasugai | |
| 10,886,646 B2 | 1/2021 | Goupil et al. | |
| 2006/0128226 A1 | 6/2006 | Segawa et al. | |
| 2008/0170838 A1 | 7/2008 | Teetzel et al. | |
| 2008/0298793 A1 | 12/2008 | Clark | |
| 2011/0239354 A1* | 10/2011 | Celona | A42B 3/04 2/422 |
| 2012/0006719 A1 | 1/2012 | Celona et al. | |
| 2012/0148195 A1 | 6/2012 | Umeno | |
| 2013/0086722 A1 | 4/2013 | Teetzel et al. | |
| 2014/0212120 A1 | 7/2014 | Bae | |
| 2014/0213074 A1 | 7/2014 | Tsang et al. | |
| 2015/0201723 A1 | 7/2015 | Rayner et al. | |
| 2015/0264229 A1 | 9/2015 | Teetzel et al. | |
| 2017/0122706 A1 | 5/2017 | Masarik et al. | |
| 2018/0019552 A1 | 1/2018 | Kasugai | |
| 2019/0386412 A1 | 12/2019 | Goupil et al. | |
| 2020/0225488 A1 | 7/2020 | Goupil et al. | |

FOREIGN PATENT DOCUMENTS

| | | |
|---|---|---|
| EP | 3714721 A1 | 9/2020 |
| JP | 2010237514 A | 10/2010 |

OTHER PUBLICATIONS

Wiki: "30-pin Connector—The iPhone Wiki", Oct. 6, 2016 (Oct. 6, 2016, XP055633555, Retrieved from the Internet: URL:https://web.archive.org/web/20161006150846/https://www.theiphonewiki.com/wiki/30-pin_Connector [retrieved on Oct. 17, 2019].

Sony: "Sony Active Interface Shoe", Apr. 30, 2017 (Apr. 30, 2017), XP055633456, Retrieved from the Internet: URL: https://www.theiphonewiki.com/wiki/30-pin_Connector [retrieved on Oct. 17, 2019].

European Search Report and Written Opinion received in EP19180370.9 dated Nov. 6, 2019.

European examination report dated Feb. 14, 2022 received in EP19180370.9.

English machine translation of Japanese published applicaiton No. JP 2010-237514 A published Oct. 21, 2010.

\* cited by examiner

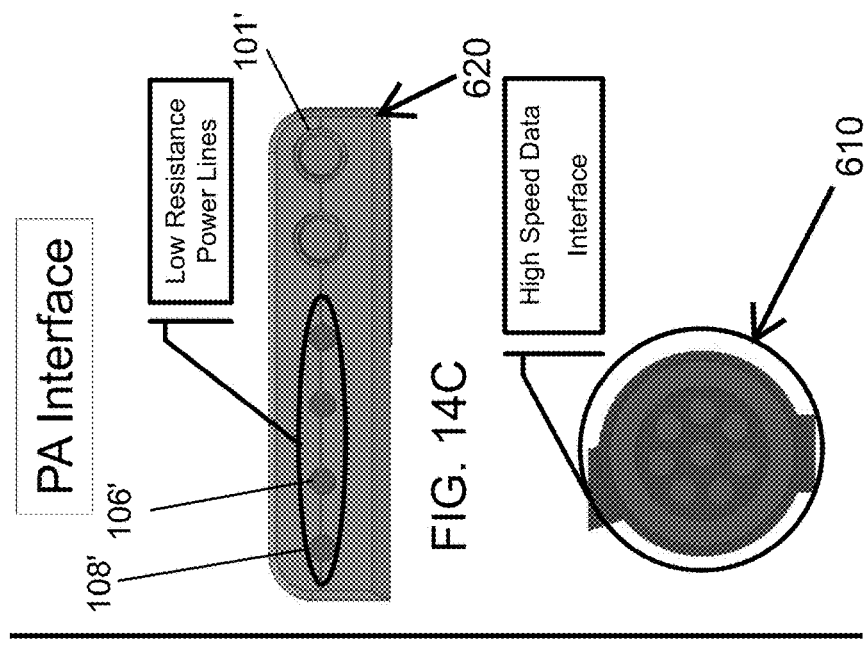
FIG. 14B
FIG. 14C
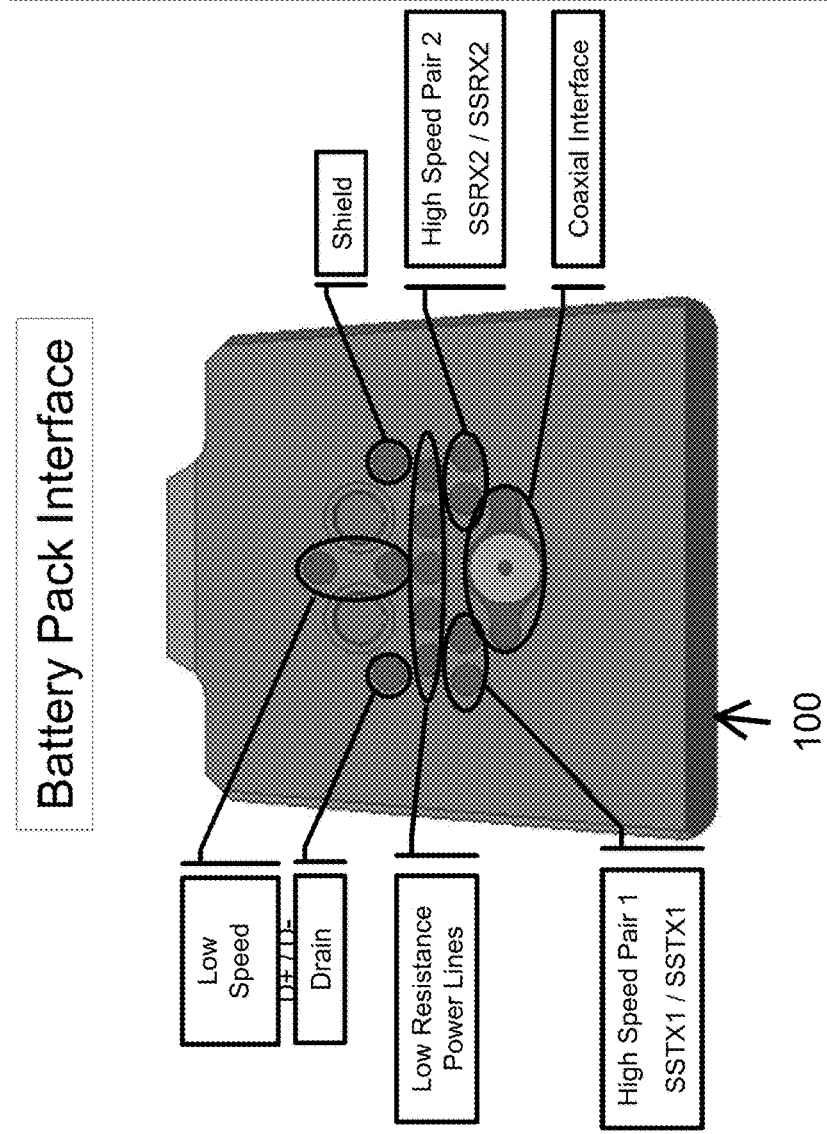
FIG. 14A

HIGH SPEED HOT SHOE

CROSS-REFERENCE TO RELATED APPLICATION

This application claims the priority benefit of U.S. Provisional Application No. 62/825,480 filed Mar. 28, 2019 (ADN 111602_2). This application also a continuation-in-part of U.S. application Ser. No. 16/441,608 filed Jun. 14, 2019 (ADN 114363), which claims the priority benefit of U.S. Provisional Application No. 62/685,180 filed Jun. 14, 2018 (ADN 111602). Each of the aforementioned application is incorporated herein by reference in its entirety.

The aforementioned applications are incorporated herein by reference in their entirety.

BACKGROUND

The present invention relates generally to a hot shoe interface capable of transmitting high speed data.

Existing data communication interfaces use external connectors that are polarized and include cables that must be physically mated or de-mated. In order to transmit video, for example, with a smart phone, a connector must be used, such as an external cable or docking station. Hot shoe interfaces are known in the art and are advantageous where ease of connection and disconnection, for example, one-handed connection and disconnection, is desired. However, existing hot shoe interfaces typically provide limited electrical coupling between devices, and are often limited to carrying power.

The present disclosure contemplates a hot shoe interface capable of serving as a communication port that may be mated and de-mated without the use of an external cable connector or a plug and socket type of connector, and without degradation of the data signal. In a more limited aspect, the hot shoe has a generally planar surface with terminal contacts such as contact pads configured to communicate with aligned contacts such as contact pins on a mounting assembly or accessory device. The contact points are capable of transmitting high speed data including video and augmented reality data across the hot shoe interface. In certain embodiments, the contact pins comprise gold plated brass pins. In another more limited aspect, the high speed hot shoe is configured for use with a helmet mount assembly. In certain embodiments, the helmet mount assembly combines fiber optic cables and high speed data cables to transmit data and power at high speeds.

SUMMARY

In one aspect, an interface system for a helmet mounting system comprises a helmet strap assembly including a strap. A helmet shroud is disposed at a first end of the helmet strap assembly and includes a shroud interface assembly configured to mate with a first hot shoe of a helmet mount assembly. The shroud interface assembly comprises a high speed data interface including a first plurality of high speed contacts which are configured to be electrically coupled to a second plurality of high speed contacts on the first hot shoe when the shroud interface assembly is coupled with the first hot shoe. A battery mount assembly comprises a second hot shoe portion disposed at a second end of the helmet strap assembly opposite the first end, wherein the second hot shoe portion is configured to mate with a hot shoe receiver of a battery pack. The second hot shoe portion comprises a high speed data interface including a third plurality of high speed contacts which are configured to be electrically coupled to a fourth plurality of high speed contacts on the hot shoe receiver of the battery pack when the second hot shoe portion is coupled with the hot shoe receiver of a battery pack.

In a more limited aspect, the helmet strap assembly is configured to be run over an exterior surface of a helmet.

In another more limited aspect, the first plurality of high speed contacts are contact pads and the second plurality of high speed contacts are electrically conductive pins.

In another more limited aspect, each high speed contact of the first plurality of high speed contacts is electrically coupled to a corresponding one of the high speed contacts of the third plurality of high speed contacts by a respective conductor of a twisted pair of conductors passing within the strap.

In another more limited aspect, each twisted pair of conductors is a twisted pair differential cable configured to provide 90 ohms of impedance.

In another more limited aspect, the shroud interface assembly further comprises a power interface including a first set of power contacts and ground contacts.

In another more limited aspect, the helmet mounting system further includes the helmet mount assembly which comprises the first hot shoe.

In another more limited aspect, the first hot shoe includes a high speed data interface portion including the second plurality of high speed contacts and a power connector portion including a second set of power contacts and ground contacts which engage the first set of power contacts and ground contacts, respectively.

In another more limited aspect, the shroud interface assembly further includes an optical interface portion including a plurality of optical terminals.

In another more limited aspect, the helmet mount assembly further comprises a receptacle including a high speed data interface portion including the plurality of high speed contacts, the receptacle configured to mate with a viewing device.

In another more limited aspect, the receptacle is configured to receive a viewing device selected from the group consisting of a night vision device, camera, and near-eye display.

In another more limited aspect, the helmet mount assembly is pivotable between a first operable position wherein the viewing device is positioned in front of an eye of a user and a the operable position and a second stowed position wherein the viewing device is positioned out of a line of sight of the user.

In another more limited aspect, the helmet mount assembly further comprises a connector configured for operable connection with an accessory device.

In another more limited aspect, the connector is a Type-C USB connector.

In another more limited aspect, the helmet mounting system further comprises the battery pack, wherein the battery pack includes the hot shoe receiver.

In another more limited aspect, the helmet mounting system further comprises an RF antenna electrically coupled to an RF interface on the second hot shoe portion.

In another more limited aspect, the RF interface is a coaxial RF interface.

In certain embodiments, a hot shoe interface system for a helmet mount assembly includes a first shoe receiver that further includes a first set of one or more electrical contacts configured to provide a power signal from a first device attached to the first receiver portion, a first hot shoe portion which includes a second set of one or more electrical contacts configured to receive the power signal, and a second hot shoe portion which includes a third set of one or more electrical contacts configured to receive the power signal, a fourth set of one or more electrical contacts configured to communicate high speed data with the first device, a fifth set of one or more electrical contacts configured to communicate low speed data with the first device, and a first set of optical terminals configured to communicate optical data with the first device. The hot shoe interface also includes a helmet strap assembly, wherein the strap assembly comprises one or more conductive pathways operably connecting the first hot shoe portion and the second hot shoe portion and a second shoe receiver includes a sixth set of one or more electrical contacts configured to receive the power signal, a seventh set of one or more electrical contacts configured to communicate the high speed data with a second device, an eighth set of one or more electrical contacts configured to communicate the low speed data with the second device, and a second set of optical terminals configured to communicate the optical data with the second device.

In certain embodiments, one or more of the high speed data, power signal, low speed data, and optical data, are transmitted from the first hot shoe portion to the second hot shoe portion via the conductive pathways.

In certain embodiments, the conductive pathways are comprised of fiber optic cabling.

In certain embodiments, the hot shoe interface system further includes a third shoe receiver, which includes a ninth set of one or more electrical contacts configured to receive the power signal, a tenth set of one or more electrical contacts configured to communicate the high speed data with the second device, an eleventh set of one or more electrical contacts configured to communicate the low speed data with the second device, and a third set of optical terminals configured to communicate optical data with the second device.

In certain embodiments, the hot shoe interface system further includes a third hot shoe portion, which includes a twelfth set of one or more electrical contacts configured to receive the power signal, a thirteenth set of one or more electrical contacts configured to communicate the high speed data with the second device attached to the third hot shoe portion, a fourteenth set of one or more electrical contacts configured to communicate the low speed data with the second device attached to the third hot shoe portion; and a fourth set of optical terminals configured to communicate the optical data with the second device.

In certain embodiments, the first shoe receiver further comprises a fifteenth set of one or more electrical contacts configured to communicate high speed data with the first device, a sixteenth set of one or more electrical contacts configured to communicate low speed data with the first device, a fifth set of optical terminals configured to communicate optical data with the first device.

In certain embodiments, the first hot shoe portion further includes a seventeenth set of one or more electrical contacts configured to communicate high speed data with the first device, an eighteenth set of one or more electrical contacts configured to communicate low speed data with the first device, and a sixth set of optical terminals configured to communicate optical data with the first device.

In certain embodiments, the fourth set of one or more electrical contacts are contact pins.

In certain embodiments, the fourth set of one or more electrical contacts is electrically coupled to one or more twisted pairs of conductors.

In certain embodiments, the first hot shoe portion and the second hot shoe portion are disposed on a helmet.

In certain embodiments, the first device is a battery pack.

In certain embodiments, the second shoe receiver and the third shoe receiver are disposed on a helmet mount assembly, wherein the third shoe receiver is removably attachable to the third hot shoe portion of the second device.

In certain embodiments, the helmet mount assembly comprises one or more coaxial antennas.

In certain embodiments, the second device is a viewing device or a camera.

In certain embodiments, the second device is pivotable between an operable position and a stowed position.

In certain embodiments, the helmet mount assembly further comprises a connector configured for operable connection with the second device.

In certain embodiments, the connector is a Type-C USB connector.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

FIG. 14A is an isometric view of a battery pack hot shoe in accordance with an exemplary embodiment.

FIG. 14B is a fragmentary view of a high speed data interface.

FIG. 14C is a side view of a power and optical interface of a helmet shroud interface assembly.

DETAILED DESCRIPTION OF THE PREFERRED EMBODIMENTS

Figure 1:
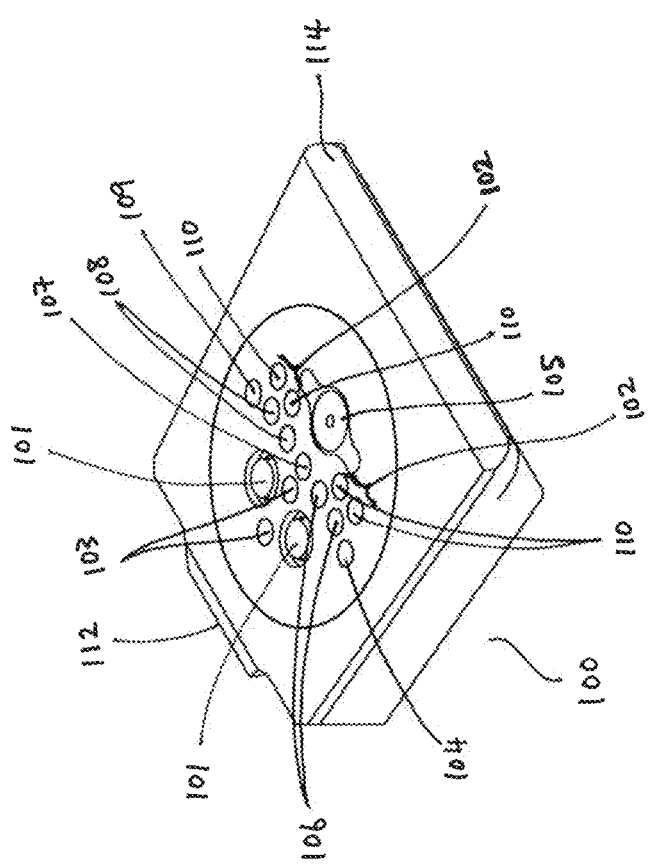
FIG. 1 is an isometric view of a hot shoe according to an exemplary embodiment.

Referring now to the drawings, FIGS. 1-4 illustrate a hot shoe interface configured to serve as a communication port with a helmet mount assembly and/or other external accessory device. The hot shoe, generally designated 100, includes a set of contact pads configured to communicate with a set of corresponding contact pins on a shoe receiver assembly generally designated 200. In certain embodiments, the hot shoe 100 is advantageously disposed on an electrically operated device (not shown) or mounting unit therefor and serves as a mechanical and electrical attachment point.

Referring now to FIG. 1, the contact pads or terminals on the hot shoe 100 include one or more of the following: optical interface terminals 101, high speed contact pairs 102 each comprising two pads 110, low speed contact pads 103, high speed drain pad 104, coaxial or radio frequency (RF) contacts 105, power ground pads 106, power drains 107, power pads 108, and shield pad 109. The hot shoe 100 further allows redundant power, ground, and/or control or data signals to pass through the interface. In certain preferred embodiments, the contact pads are gold plated, e.g., gold plated brass or gold plated copper, to minimize corrosion. Each high speed contact pad 110 is electrically coupled to a respective conductor 217 of a twisted pair 218 of conductors. In certain preferred embodiments, the twisted pair 218 of conductors is a twisted pair differential cables configured to provide 90 ohms of impedance to support high speed transmission performance.

Each pair of adjacent contacts 110 defines a pair of contact pads 102. The contact pads 110 defining each pair 102 are preferentially arranged/spaced apart to facilitate transmittal of data with the proper level of impedance. Each pad may be hardwired, e.g., soldered directly to a cable, or connected to a circuit board or other circuit substrate. In certain embodiments where the pads are soldered to a circuit board or substrate, such as a printed circuit board, the circuit board traces of the conductive pair should be of equal lengths and widths in order to control impedance.

In certain embodiments, the radio frequency contact 105 is a coaxial conductor pair, e.g., an RF-type connector for transmitting an RF video signal (e.g., composite video) across the hot shoe interface.

In certain preferred embodiments, the hot shoe 100 has a generally planar surface 113, without plugs or receptacles. The surface 113 is advantageously sealed with a sealing ring or gasket. In certain embodiments, the sealing ring or gasket is positioned on the complementary shoe receiver assembly 200 and forms a seal when the hot shoe 100 is engaged with the shoe receiver assembly 200. In certain embodiments, the hot shoe 100 includes a front lip 114 which may include a ramped or inclined surface to facilitate connection with the shoe receiver assembly 200. The hot shoe 100 further includes a rear lip 112 which may include a ramped or inclined surface to facilitate connection with the shoe receiver assembly 200.

In certain embodiments, the hot shoe interface is capable of communicating data at high speeds, e.g., greater than 1.5 gigabits per second. In certain embodiments, the hot shoe interface is further capable of transmitting video data and/or augmented reality data sent from an accessory device, such as a viewing device.

Figure 2:
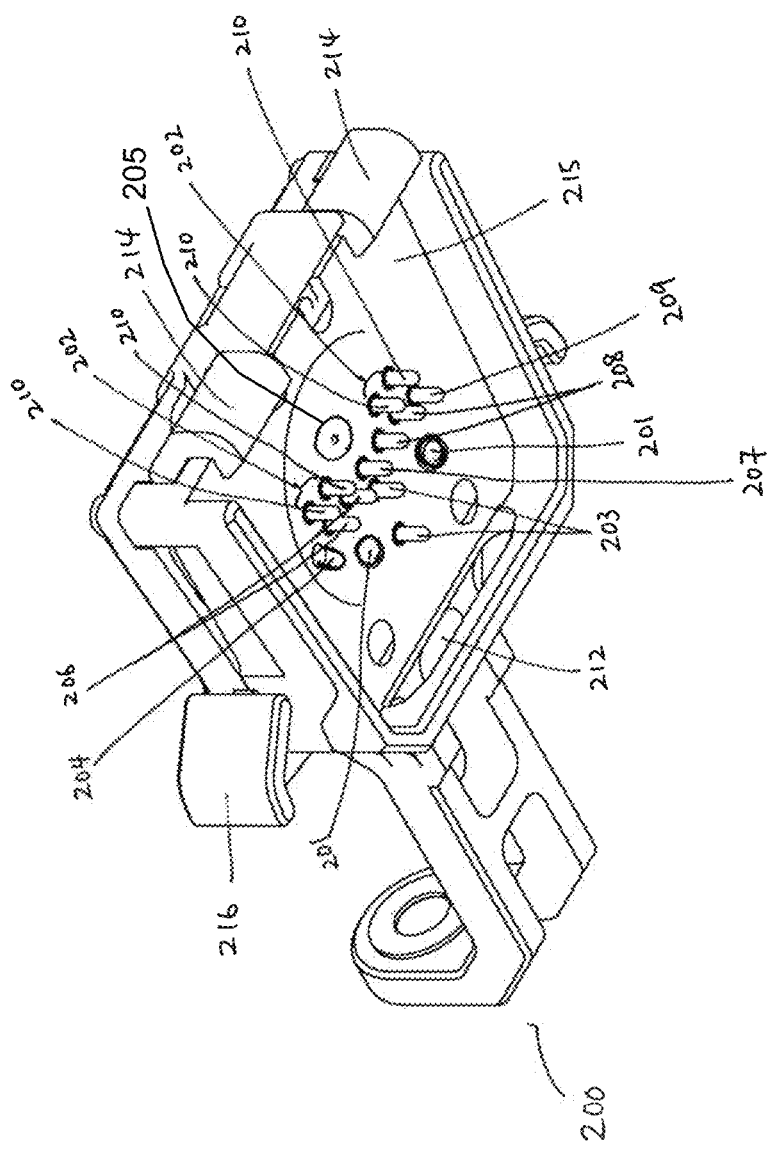
FIG. 2 is an isometric view, taken generally from the bottom, of a shoe receiver assembly configured to interface with the hot shoe of FIG. 1.
Figure 3:
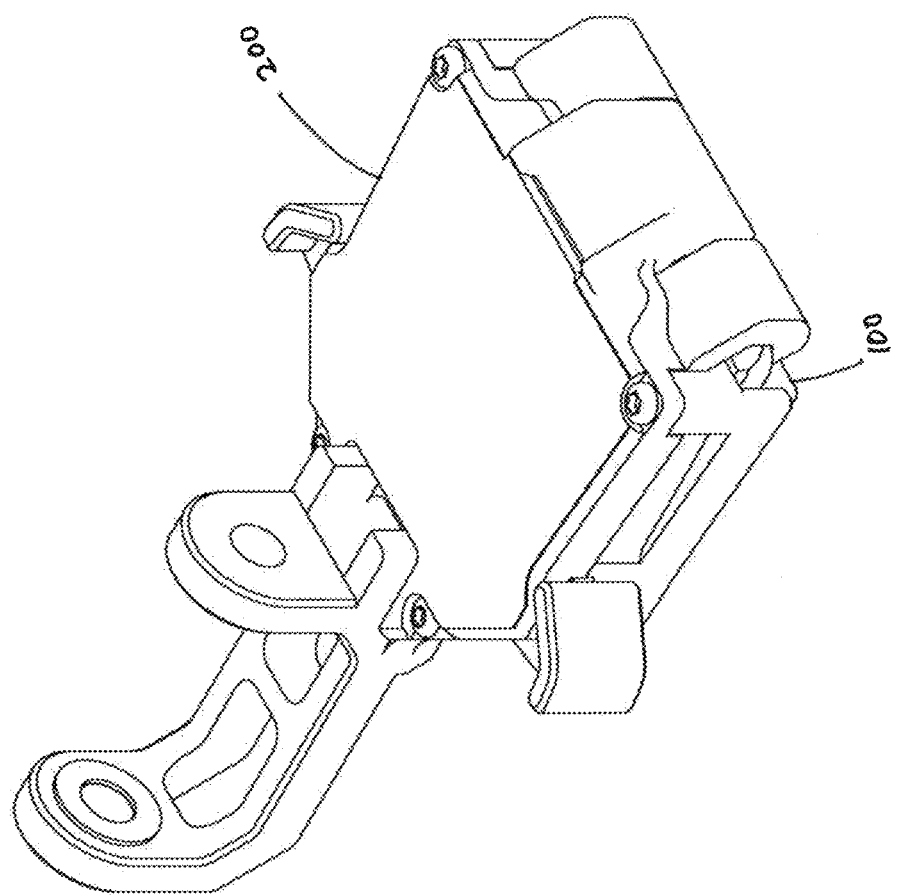
FIG. 3 is an isometric view, taken generally from the top, of the shoe receiver assembly of FIG. 2 engaged with the hot shoe of FIG. 1.
Figure 4:
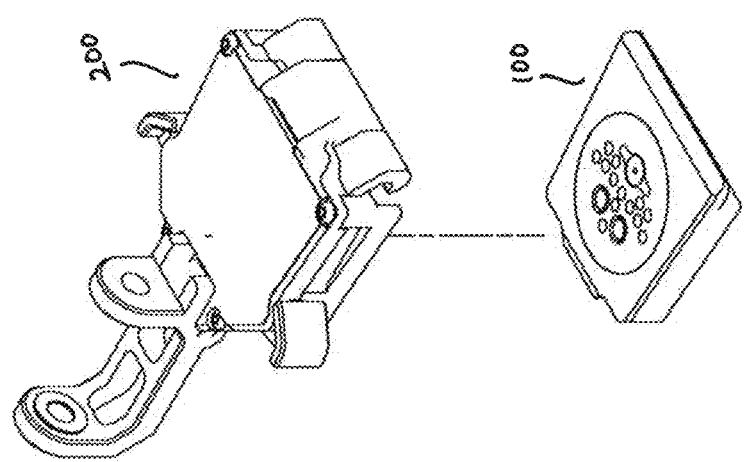
FIG. 4 is a partially exploded view of the shoe receiver assembly of FIG. 2 in relation to the hot shoe of FIG. 1.

Referring now to FIGS. 2 and 3, the shoe receiver assembly 200 includes a hot shoe receptacle 215. In certain embodiments, the shoe receiver assembly 200 includes a resilient fastener element 214 for removable attachment of the shoe receiver assembly 200, e.g., of an accessory device, battery pack, etc., to a hot shoe 100, e.g., via a snap fit engagement with the edges of the hot shoe 100. It is recognized that other means of attachment are contemplated, e.g., wherein the hot shoe 100 slides into a hot shoe receptacle portion 215 of the shoe receiver assembly 215 and is held in place by a lock or clamp mechanism. Activation of a release mechanism 216 allows the hot shoe 100 to be released for removal of the viewing device, battery pack, or other device, from the respective mounting assembly.

As illustrated in FIG. 2, the hot shoe receptacle 215 includes a number of contact pins for coupling with the corresponding aligned contact pads of the hot shoe 100. In certain embodiments, the contact pins are pogo pins (i.e., telescoping, spring biased pins), conductive spring-loaded buttons, or other suitable physical connection transmitting feature. In certain embodiments, high speed contact pins 210 are gold plated brass or gold plated copper pins. When the hot shoe receptacle 215 is attached to the hot shoe 100, the contact pins on the hot shoe receptacle 215 are in operable connection with a respective aligned one of the contact pads 110 on the hot shoe 100, such that data and power may be transmitted through the hot shoe interface.

The illustrated hot shoe receptacle 215 includes one or more of the following contact points: optical interface terminal 201, high speed contact pins 210, low speed contact pins 203, high speed drain pins 204, RF contact points 205, ground pins 206, power drains 207, power pins 208, and shield pin 209. Each high speed contact pin 210 is coupled to a respective conductor 217 of a twisted pair cable 218.

Each set of adjacent pins 210 comprises a pair of contact pins 202 and corresponds to contact pads 110. Optical interface terminals 201 on the hot shoe receptacle 215 are in optical communication with the respective aligned optical interface terminals 101 on the hot shoe 100. Low speed contact pins 203 on the hot shoe receptacle 215 are operably aligned with the low speed contact pads 103 on the hoe shoe 100. Drain pins 204 (for the high speed conductors) on the hot shoe receptacle 215 are operably aligned with high speed drain pads 104 on the hot shoe 100. RF contact points 205 on the hot shoe receptacle 215 are operably aligned to RF contacts 105 on the hot shoe 100. Power ground pins 206 on the hot shoe receptacle 215 are operably aligned with power ground pads 106 on the hot shoe 100. Power drain pins 207 on the hot shoe receptacle 215 are operably aligned with the drain pads 107 on the hot shoe 100. Power pins 208 on the hot shoe receptacle 215 are operably aligned with power pads 108 on the hot shoe 100. Shield pin 209 on the hot shoe receptacle 215 is operably connected to shield pad 109 on the hot shoe 100.

In certain embodiments, the shoe receiver assembly 200 includes one or more front catch mechanisms 214, to removably engage the front lip 114 of the hot shoe 100. The shoe receiver assembly 200 further includes an opening 212 for removably engaging the rear lip 112 of the hot shoe 100. In certain embodiments, the shoe receiver assembly 200 includes a release lever 216 for disconnection of the shoe receiver assembly 200 from the hot shoe 100. The release lever 216 is operably connected to the catches 214 such that engagement of the release lever 216 disengages the catches 214 from the front lip 114.

In certain embodiments, wherein the hot shoe interface is employed in connection with a helmet mount assembly 300, e.g., for positioning a viewing device 400 in front of the eyes of a user, the viewing device 400 may be operable when an attached accessory device, such as a night vision device or other viewing device, is in an active/viewable position and powered off when the mounted accessory device is moved to a stowed or inactive position (i.e., when not in use). In certain embodiments, the accessory device, for example, a viewing device, includes a magnetic sensing device, such as a reed switch, Hall effect sensor, magnetometer or the like, for sensing when the mount assembly 300 is in an operative position, e.g., an active/viewing position versus stowed position. When the mount assembly 300 is in an active position, the accessory device is powered on and able to receive or transmit data, including video or augmented reality data, via the hot shoe interface. Other means of activating or deactivating the accessory device are contemplated, such as manual buttons or switches.

Figure 5:
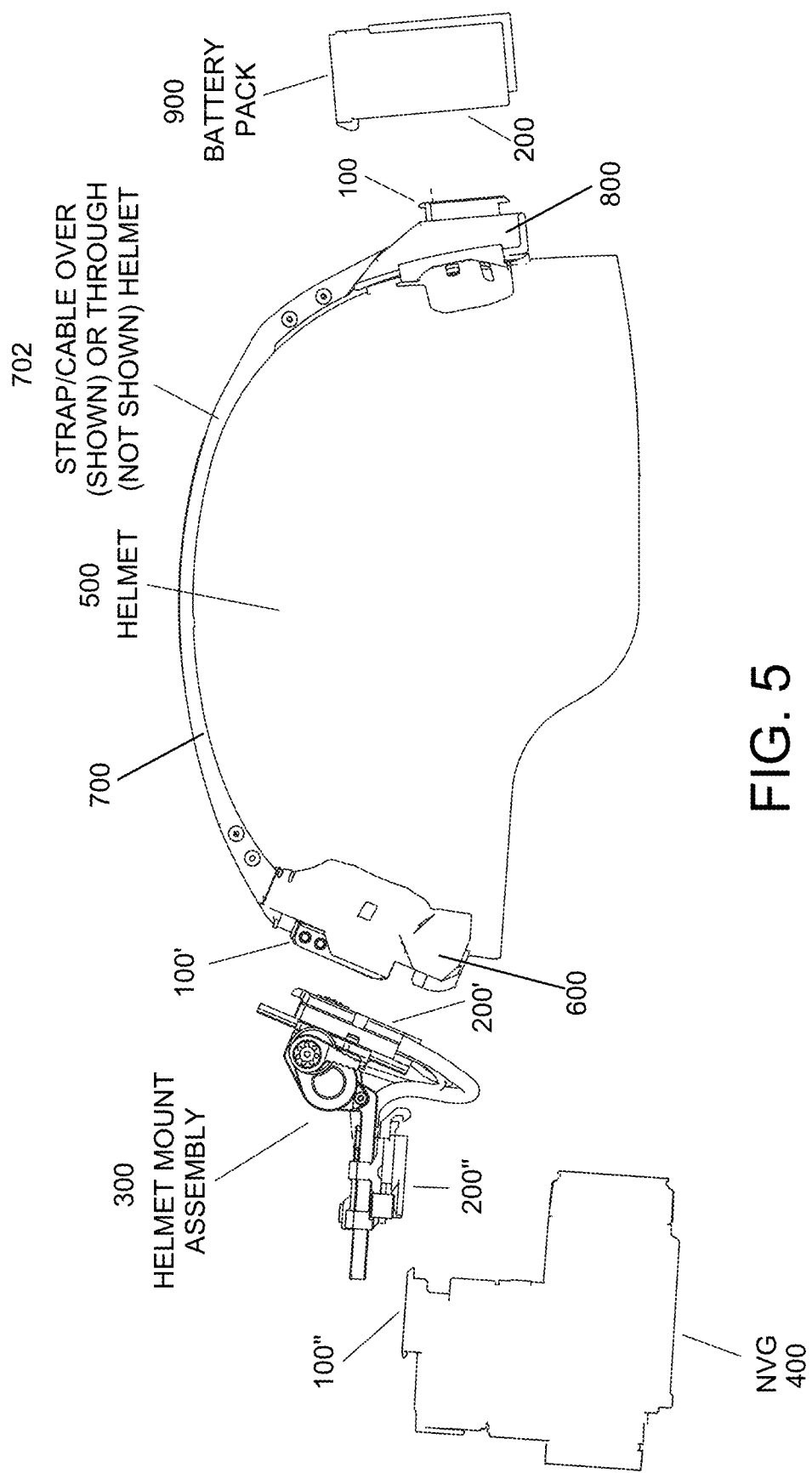
FIG. 5 is a partially exploded view of a helmet mount system with a helmet strap system employing the hot shoe interface of FIG. 3.

The hot shoe interface may be used with, for example, a helmet system 500. Referring now to FIG. 5, there is shown an exemplary helmet system including a battery pack 900, helmet mount 300, and viewing accessory (e.g., a night vision device) 300. In certain embodiments, a system with multiple hot shoe interfaces is contemplated. For example, as illustrated in FIG. 5, a helmet system with multiple hot shoe interfaces is contemplated, wherein the first hot shoe 100 is mounted to a rear portion of the helmet and is configured to connect to an external battery pack 900 having a having a shoe receiver assembly 200. A helmet shroud 600 disposed on the front of the helmet 500 includes a shroud interface assembly 100', e.g., defining a hot shoe receiver. The shroud interface assembly 100' is mounted to a front portion of the helmet and is configured to connect to a first end of a helmet mount assembly 300 having a second hot shoe 200' on the first end of the helmet mount assembly 300. A third hot shoe 100" is disposed on the second end of the helmet mount assembly 300. The third hot shoe 100" is configured to connect to a shoe receiver assembly 200" of an accessory device 400. The accessory device may be a night vision goggle, camera, and/or other near-eye display, and so forth. The accessory device may alternatively be a helmet mounted display screen, heads-up display, or any other helmet mounted optical, electro-optical, or other viewing or tactical device that may be mounted to the helmet mount assembly 300 or configured to mount directly or indirectly to the helmet. In certain embodiments, the helmet mount assembly 300 and/or the shoe receiver assembly 200 are adjustable. It will be recognized that the present development is not limited to use with helmets. It will also be recognized that any one or more of the hot shoe 100/shoe receiver assembly 200 pairs as shown in FIG. 5 may be reversed from the arrangement depicted in FIG. 5.

In certain embodiments, the helmet includes one or more conductive pathways to provide power, control and/or data signals between a power source, such as the outside battery pack, and the helmet mount accessory and/or accessory device. In certain embodiments, the conductive pathways include fiber optic cabling. In certain embodiments, the conductive pathways include copper cabling, such as high speed copper cables. In certain embodiments, the conductive pathways include a combination of fiber optic and high speed copper cabling.

In certain embodiments, an outside computer processor, such as a computer processor on a weapon, may be configured to communicate wirelessly with the battery pack and/or accessory device and control the same.

Figure 17C:
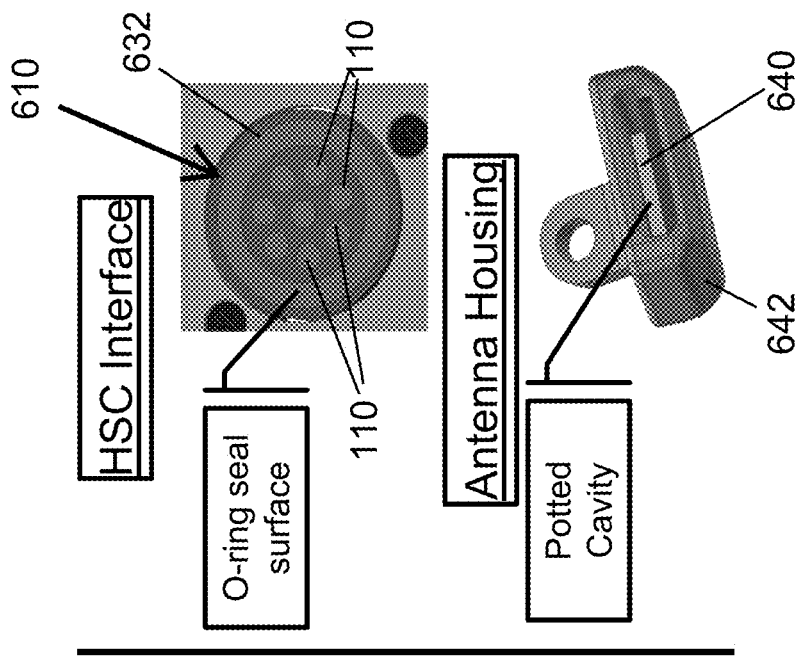
FIG. 17C is an isometric view of a housing for an RF antenna provided on the helmet shroud mounting assembly illustrated in FIG. 10.
Figure 17B:
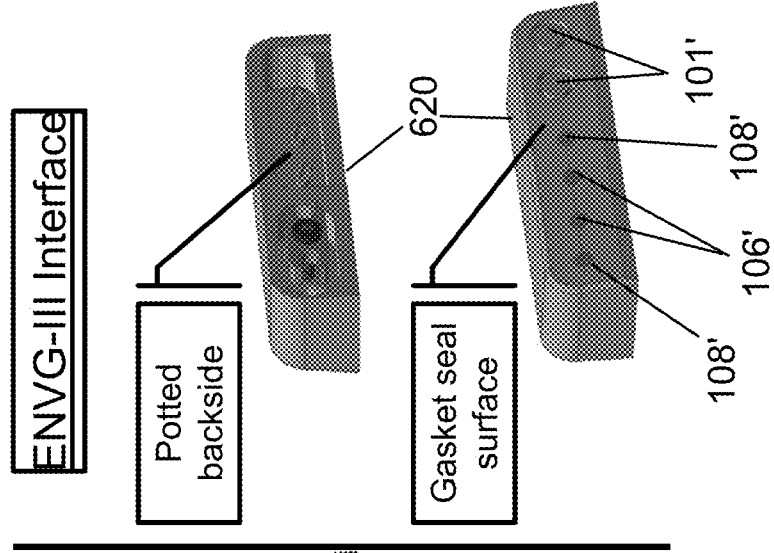
FIG. 17B illustrates front and back views of a power and optical interface of the helmet shroud interface assembly of FIG. 14C.
Figure 17A:
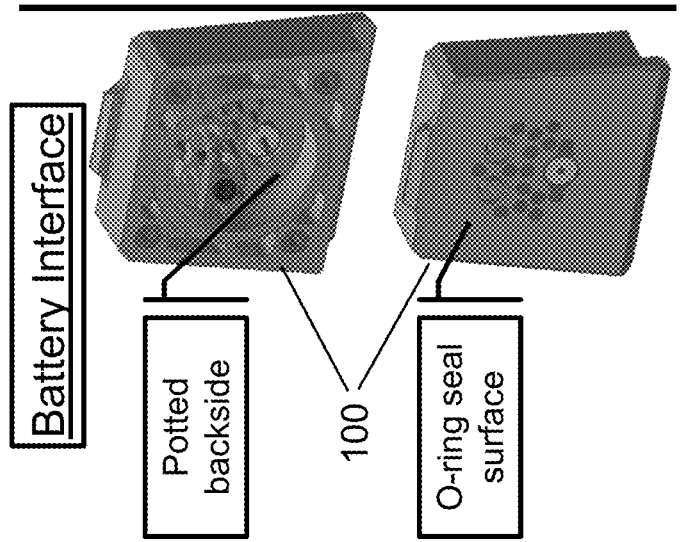
FIG. 17A illustrates isometric views of the top and bottom surfaces of the battery pack hot shoe appearing in FIG. 14A.

In certain embodiments, a battery pack 900 for the helmet system includes a shoe receiver assembly 200, which has electrical pin terminals, optical terminals, and RF interface terminals as described above by way of reference to FIG. 2. A battery mounting bracket or shroud 800 on the helmet includes a hot shoe 100 which has electrical pad terminals, optical terminals, and RF interface terminals as described above by way of reference to FIG. 1. FIG. 17A illustrates an enlarged view of the front side and potted backside of the hot shoe interface 100.

A front shroud assembly 600 includes a high speed interface 100' which engages a complementary shoe receiver assembly interface 200' on the helmet mount assembly 300. A preferred embodiment of the interface 100', depicted generally in FIG. 5, appears in FIG. 10. A preferred embodiment of the interface 200', depicted generally in FIG. 5, appears in FIGS. 11 and 12.

Figure 8:
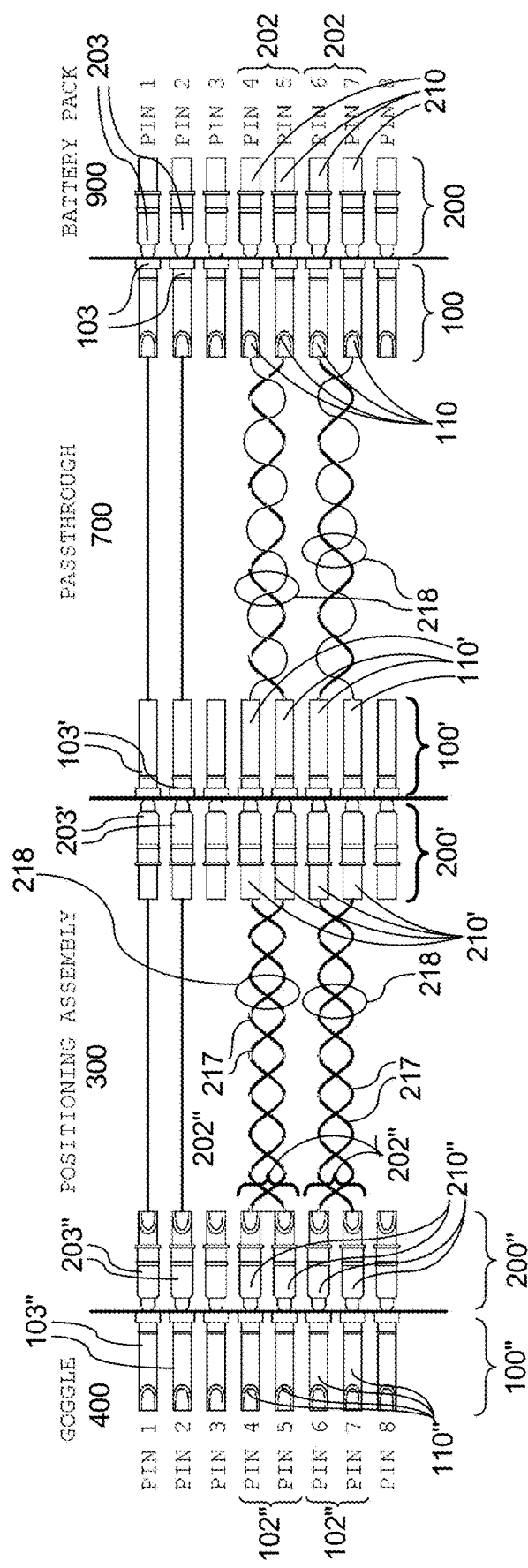
FIG. 8 is a schematic diagram of an exemplary series of hot shoe interfaces in a helmet mount system between a remote battery pack and a helmet mounted device.

Referring to FIG. 8, there appears a schematic diagram of an exemplary series of hot shoe interfaces in a helmet mount system between a remote battery pack and a helmet mounted device.

Figure 9:
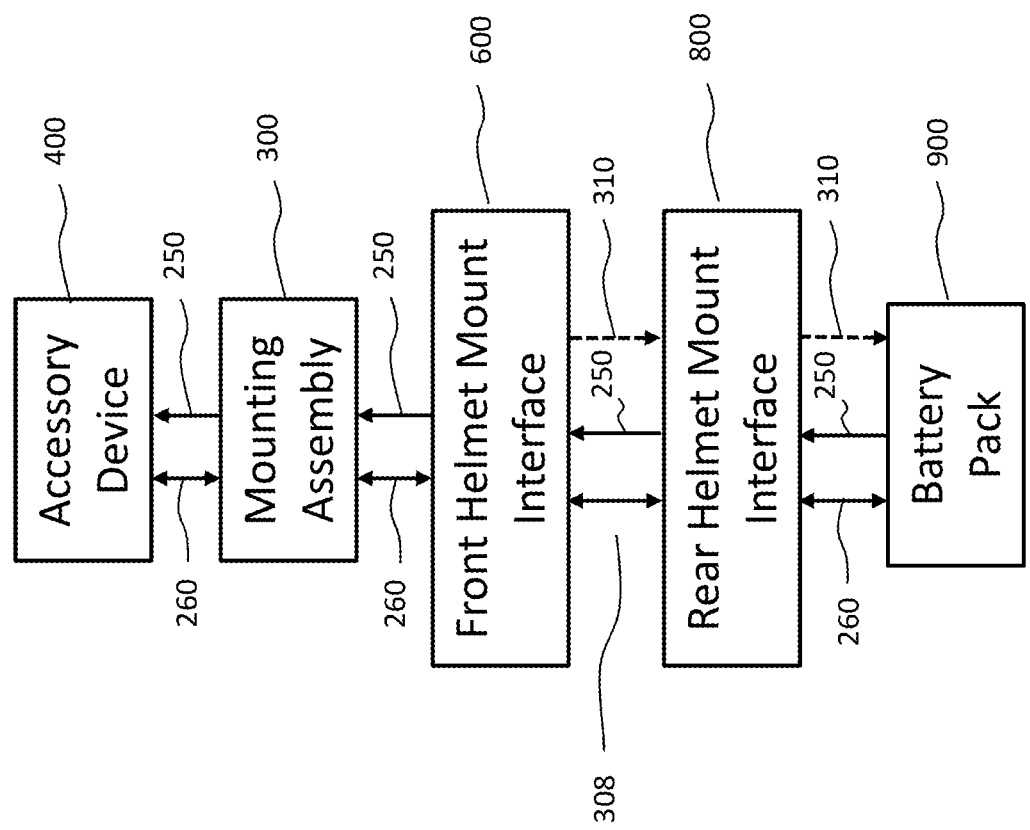
FIG. 9 is a block diagram of an exemplary flow of data and power in a helmet mount assembly system.

Referring to FIG. 9, there appears a block diagram of an exemplary flow of data and power in a helmet mount assembly system including an accessory device 400 operably connected to a mounting assembly 300 which is further connected to a front helmet mount interface of the helmet mount assembly 300. A battery pack 900 is mounted to the rear helmet mount interface 800. Power 250 is transmittable from the battery pack 900 to the helmet mount interface 300 and across the entire helmet mount system to the accessory device 400. The system is capable of transmitting data 260, including without limitation high speed video and/or audio and video data across the system from accessory device 400 to the helmet mount assembly 300 or to the battery pack 900 or vice versa. In certain embodiments, one or more coaxial RF antennas 640 housed within antenna housing 642 (as illustrated in FIG. 17C) receive wireless signals 310 and transmit such signals across a coaxial interface of the helmet mount assembly 300. In certain embodiments, the battery pack 900 includes a video recording module for storing data representative of video images acquired by the accessory device 400. In certain embodiments, the battery pack includes an augmented reality processor for generating video data which is combined with or overlaid upon video images acquired by the accessory device to provide video output via a display screen(s) of the accessory device 400 to provide an augmented or enhanced visual perception of the user's environment.

Figure 10:
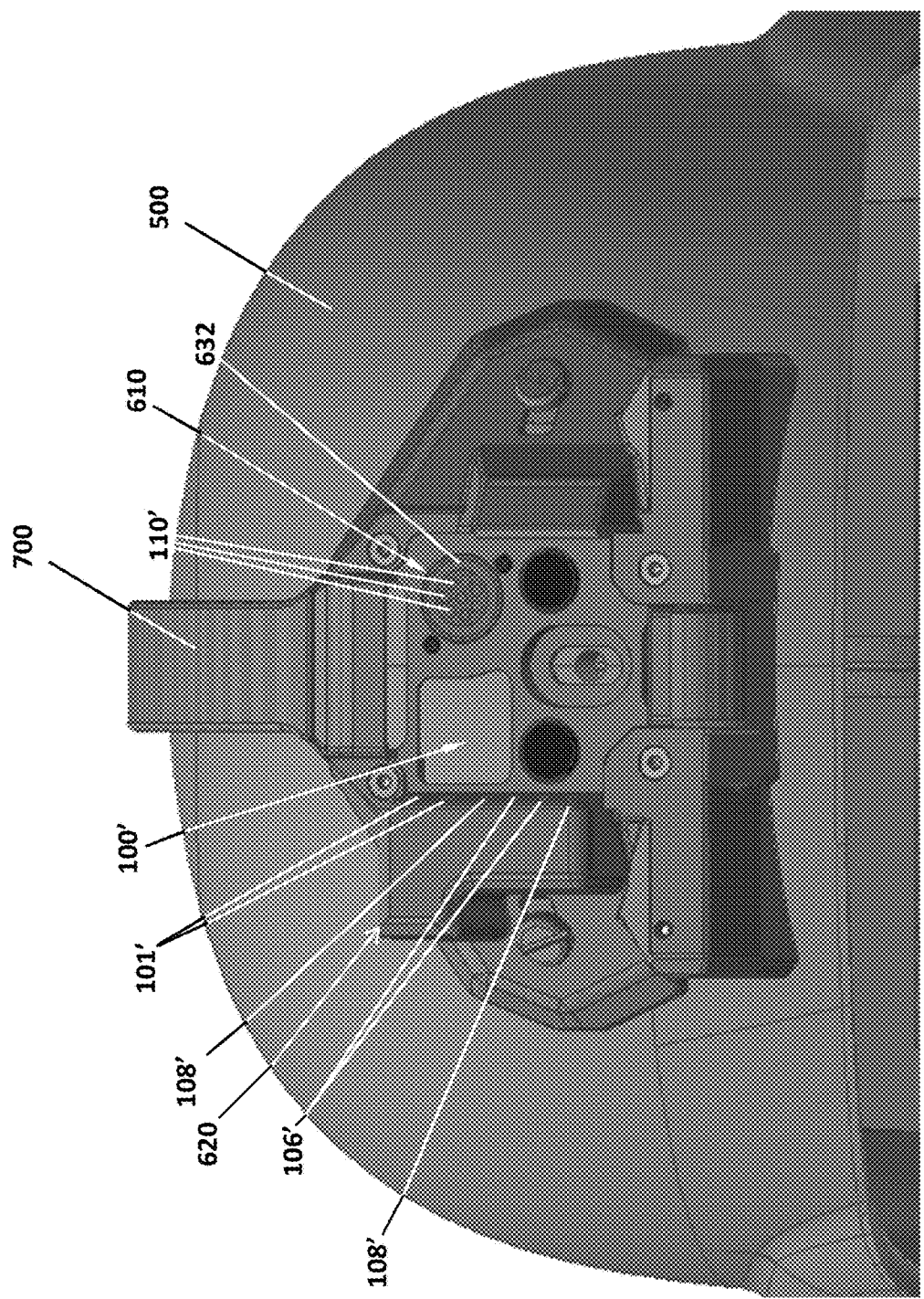
FIG. 10 is a front view illustrating a helmet having a helmet shroud including a hot shoe interface according to a second embodiment.

FIG. 10 illustrates an alternative embodiment of a hot shoe. The helmet shroud 600 includes an interface assembly 100', which includes a high speed data interface 610, including high speed contact pads 110', which are electrically coupled to high speed contact pins 210' when the hot shoe is coupled with the hot shoe receiver 200' of the helmet mount assembly 300. In certain embodiments, the interface assembly 100' also includes a power interface 620 including low resistance power line pads 106' and 108' (as illustrated in FIG. 17B). Conductors and optical fibers connecting the hot shoe 100 of the battery mount assembly 800 and the interface 100' of the helmet mount assembly 300 pass within the helmet strap 700. In certain embodiments, the interface assembly 100' further includes optical terminals 101' which are optically coupled to the optical terminals 101 on the shoe 100. The strap assembly 700 includes a strap 702 extending along a centerline of the helmet 500 between the front shroud portion 304 of the helmet mount assembly 300 and the battery bracket portion 806 of the battery mounting assembly 800.

Figure 6:
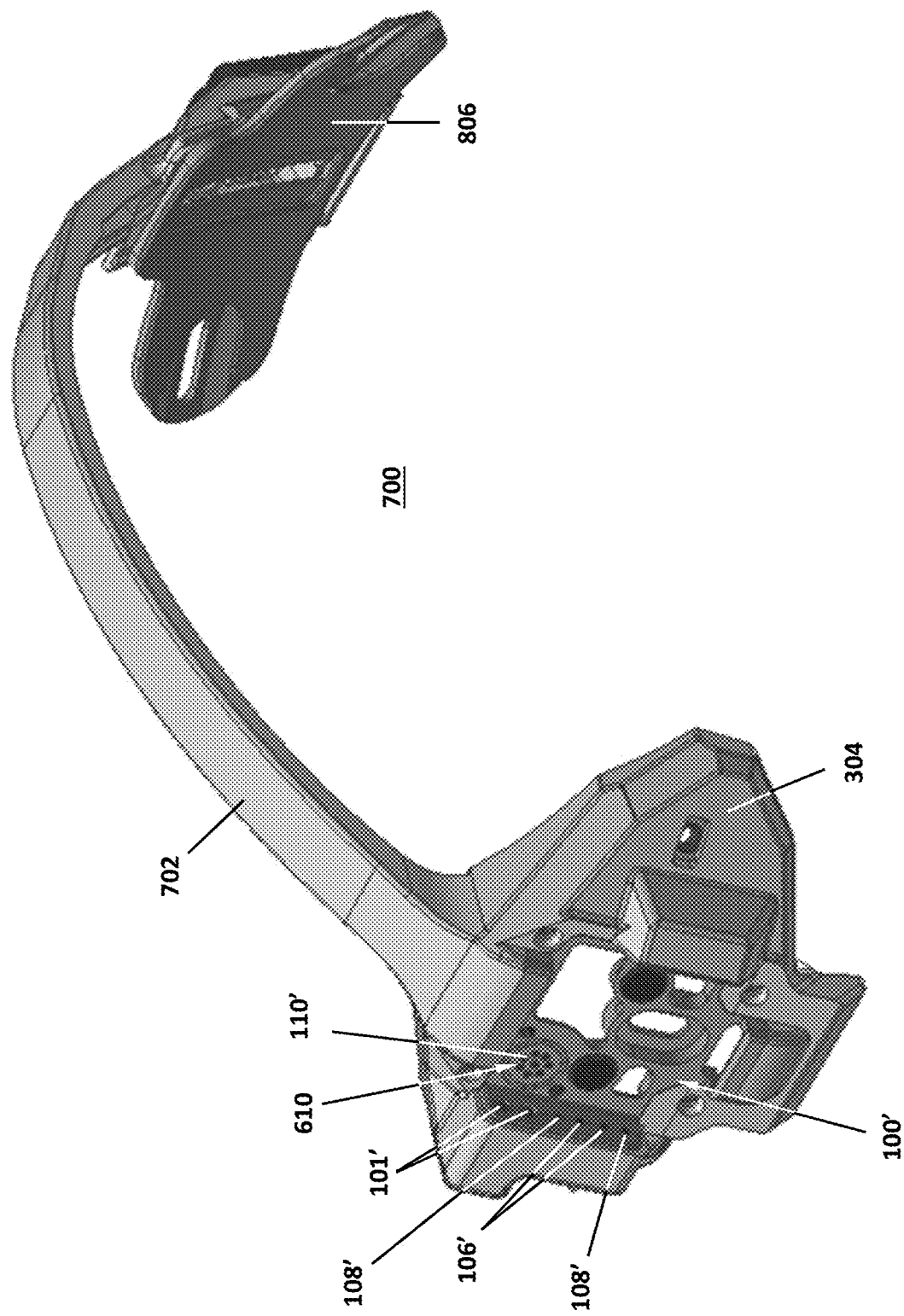
FIG. 6 is an isometric view, taken generally from the front and right side, of the helmet strap system in FIG. 5.
Figure 7:
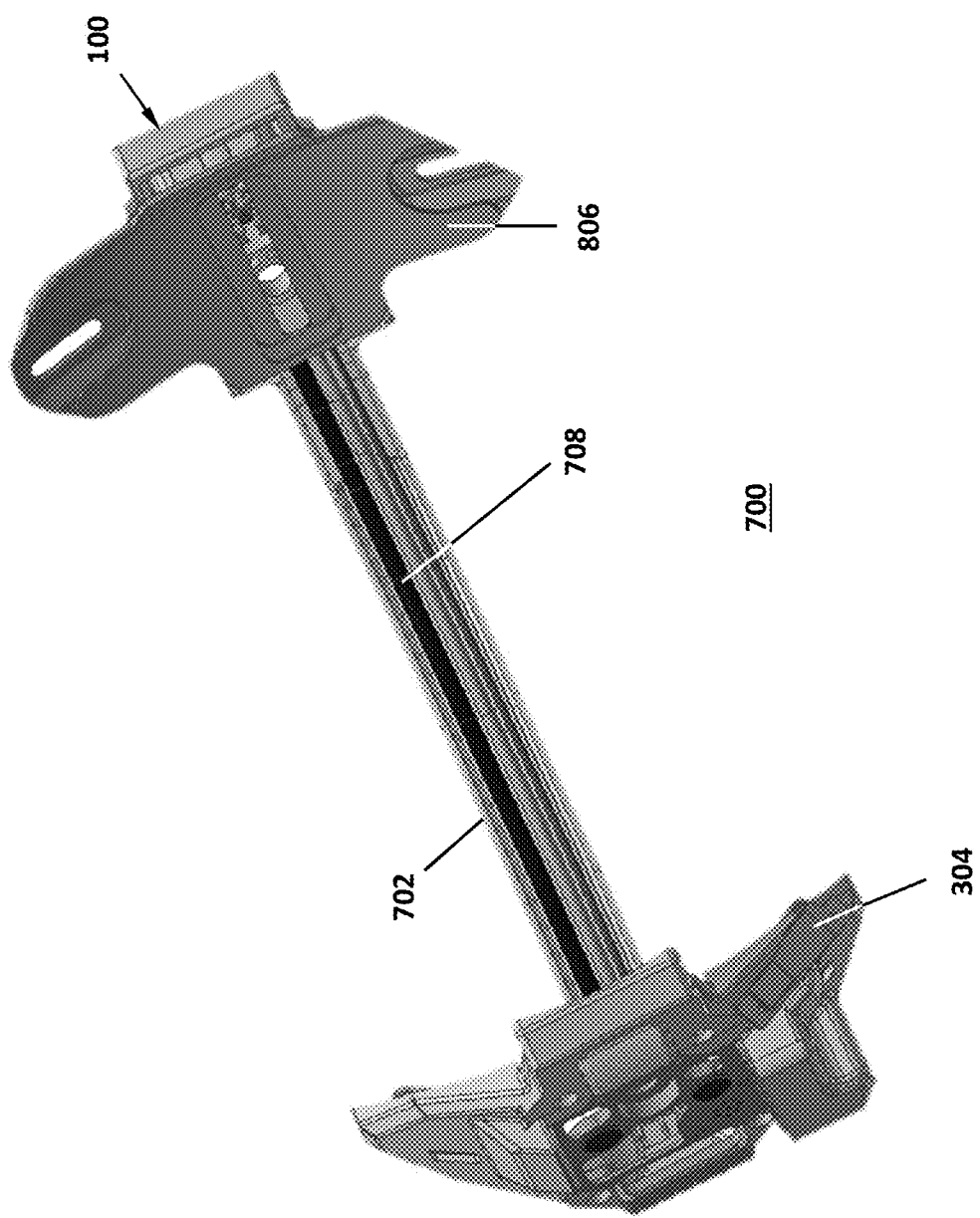
FIG. 7 is a bottom view of the helmet strap system in FIG. 5.
Figure 16:
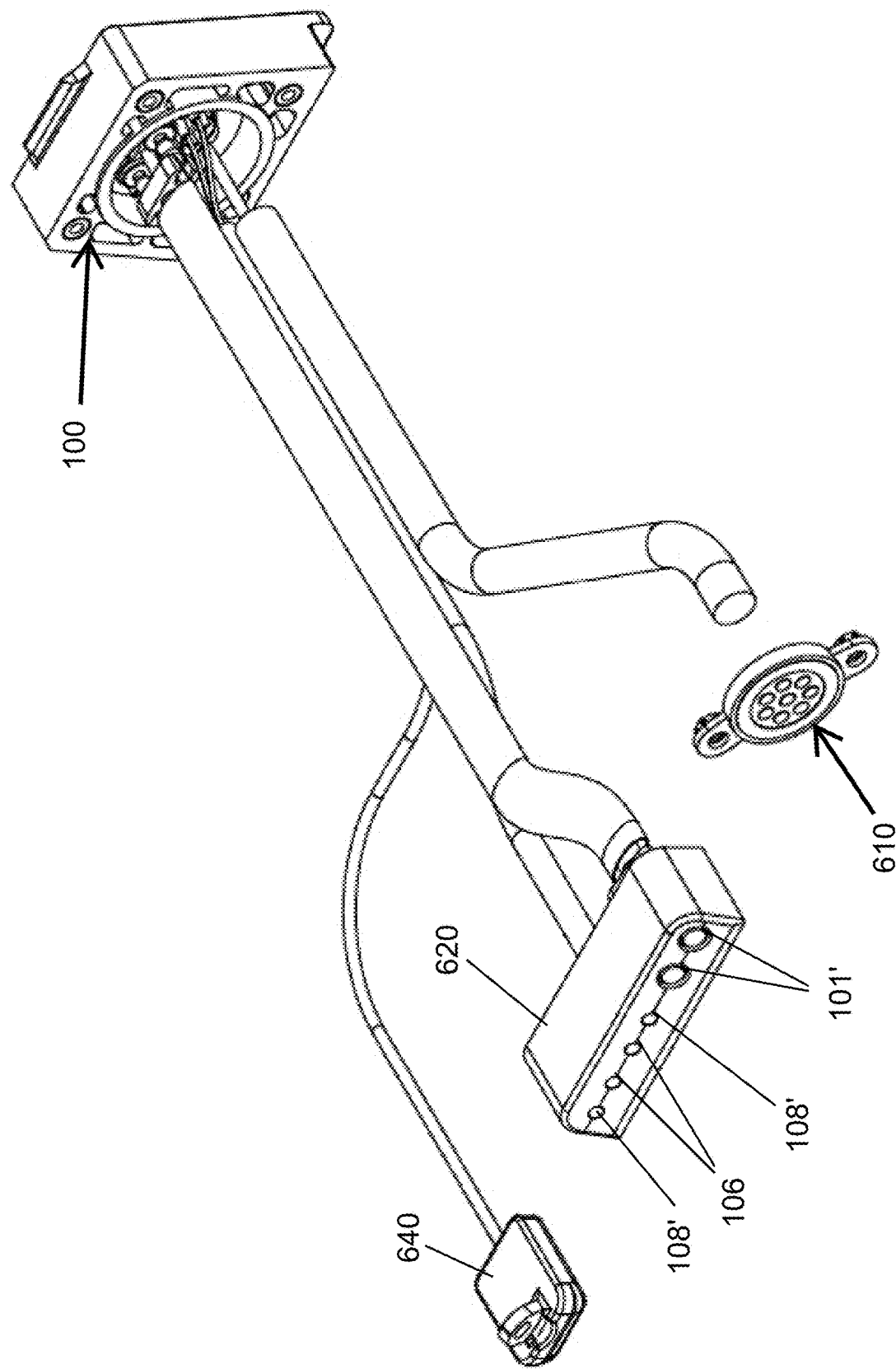
FIG. 16 is an isometric view of exemplary cabling connecting the helmet shroud mounting assembly to the battery pack hot shoe interface.

An exemplary strap assembly 700 is illustrated in FIGS. 6-7. In certain embodiments, the conductive pathways in the helmet mount assembly system are configured to run externally over the helmet. The cabling 708 is run through a center chassis portion 702 of the helmet strap assembly 700 that retains the wires 708, for example, in captured grooves on the underside of the chassis portion 702. In alternative embodiments, the conductive pathways are configured to run internally through the helmet. An illustration of exemplary wiring and optical cable with the strap removed is shown in FIG. 16.

Figure 15:
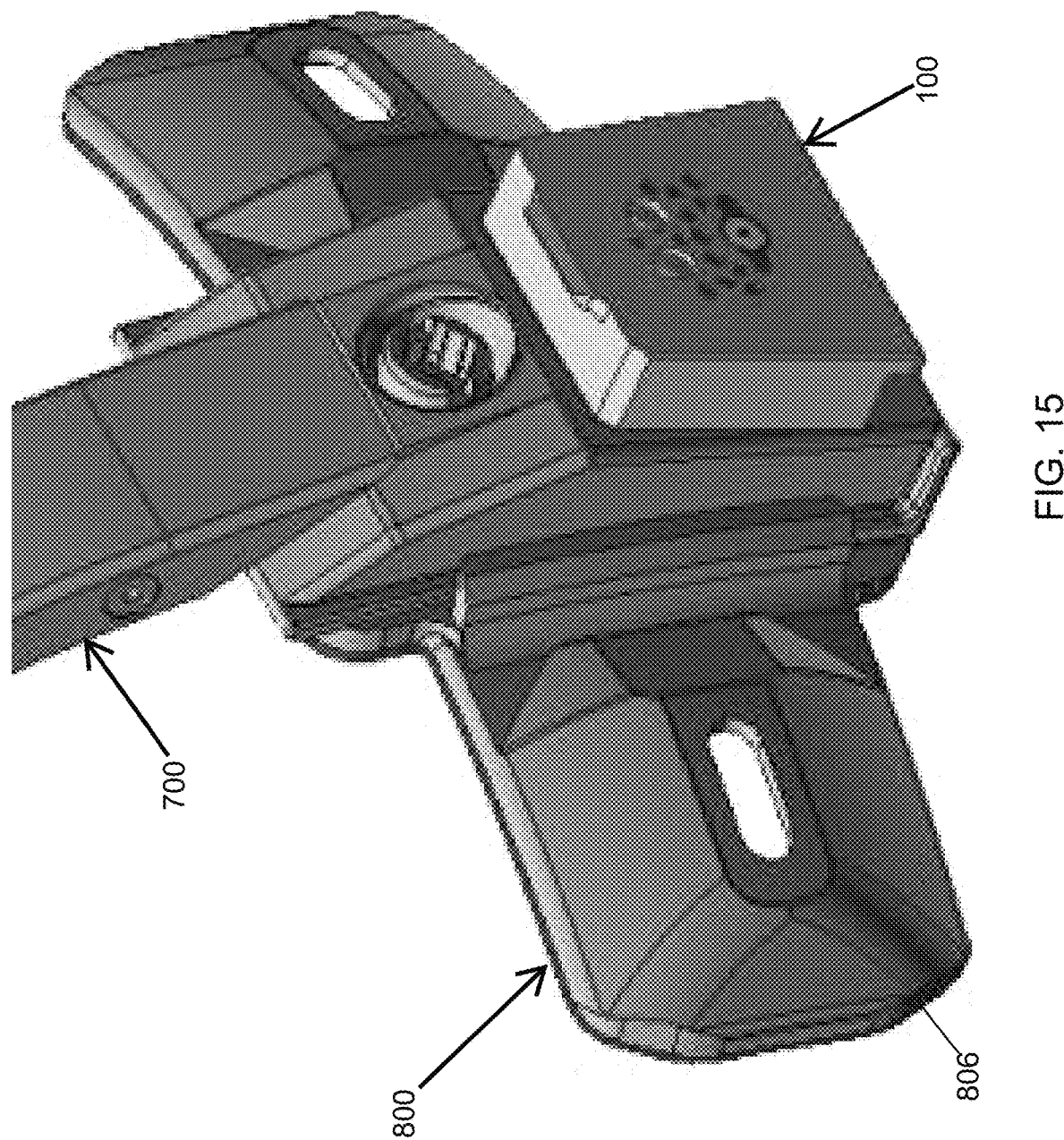
FIG. 15 is a fragmentary view of the helmet strap system illustrating the battery mount shroud appearing in FIG. 6 and the battery pack hot shoe interface appearing in FIG. 14A.

An enlarged view of the battery pack interface appears in FIG. 14A. An enlarged view of the high speed data interface 610 appears in FIG. 14B. An enlarged view of the power and optical interface 620 appears in FIG. 14C. An enlarged view of the battery mount shroud and hot shoe interface 100 appears in FIG. 15.

Figure 11:
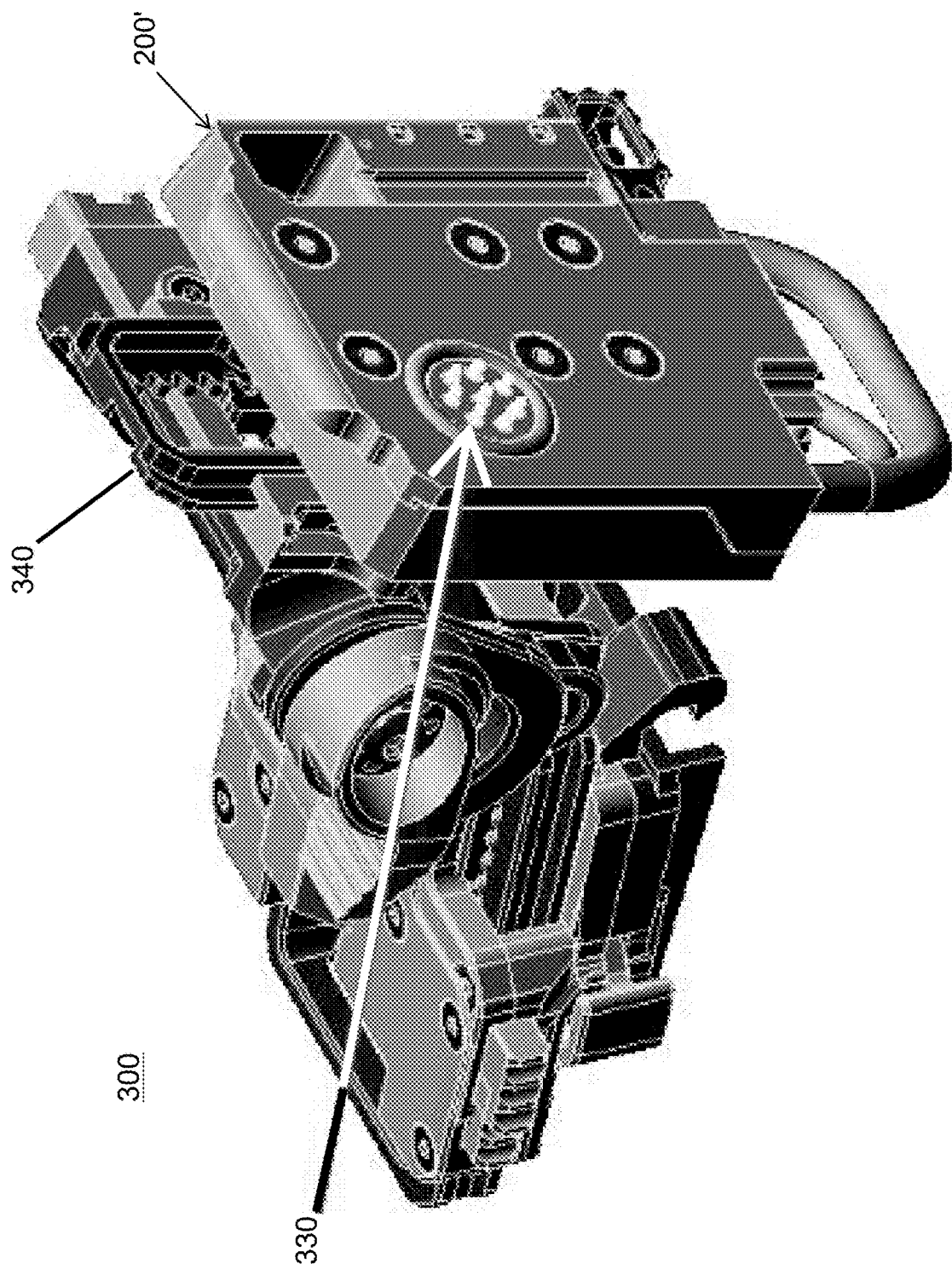
FIG. 11 is rear and right side view of a helmet mount assembly for positioning in front of the eyes of a user a viewing device that has a hot shoe interface portion in accordance with a first embodiment this disclosure.
Figure 12:
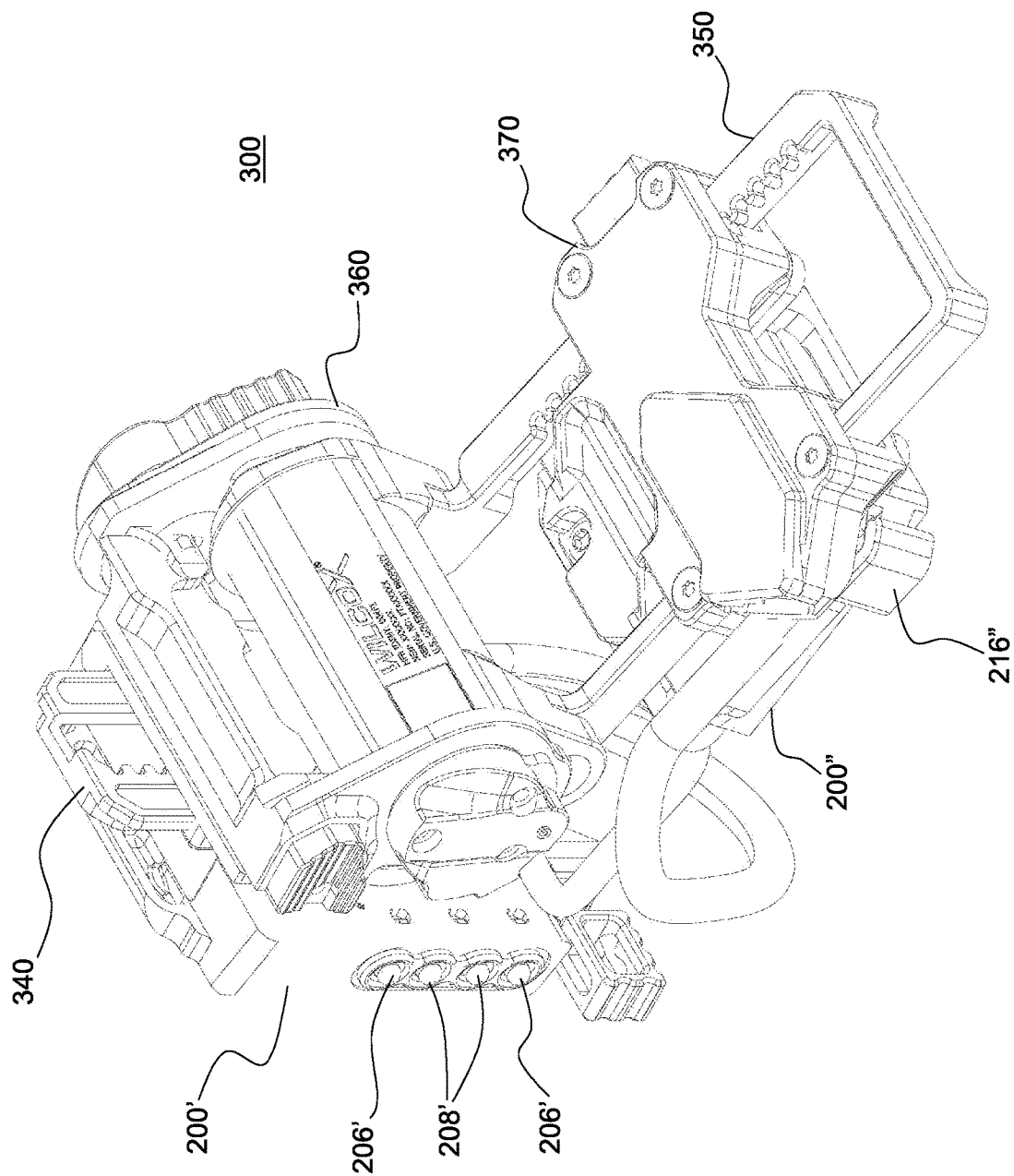
FIG. 12 is an isometric view, taken generally from the front and left side, of the helmet mount assembly for positioning a viewing device appearing in FIG. 11.
Figure 13:
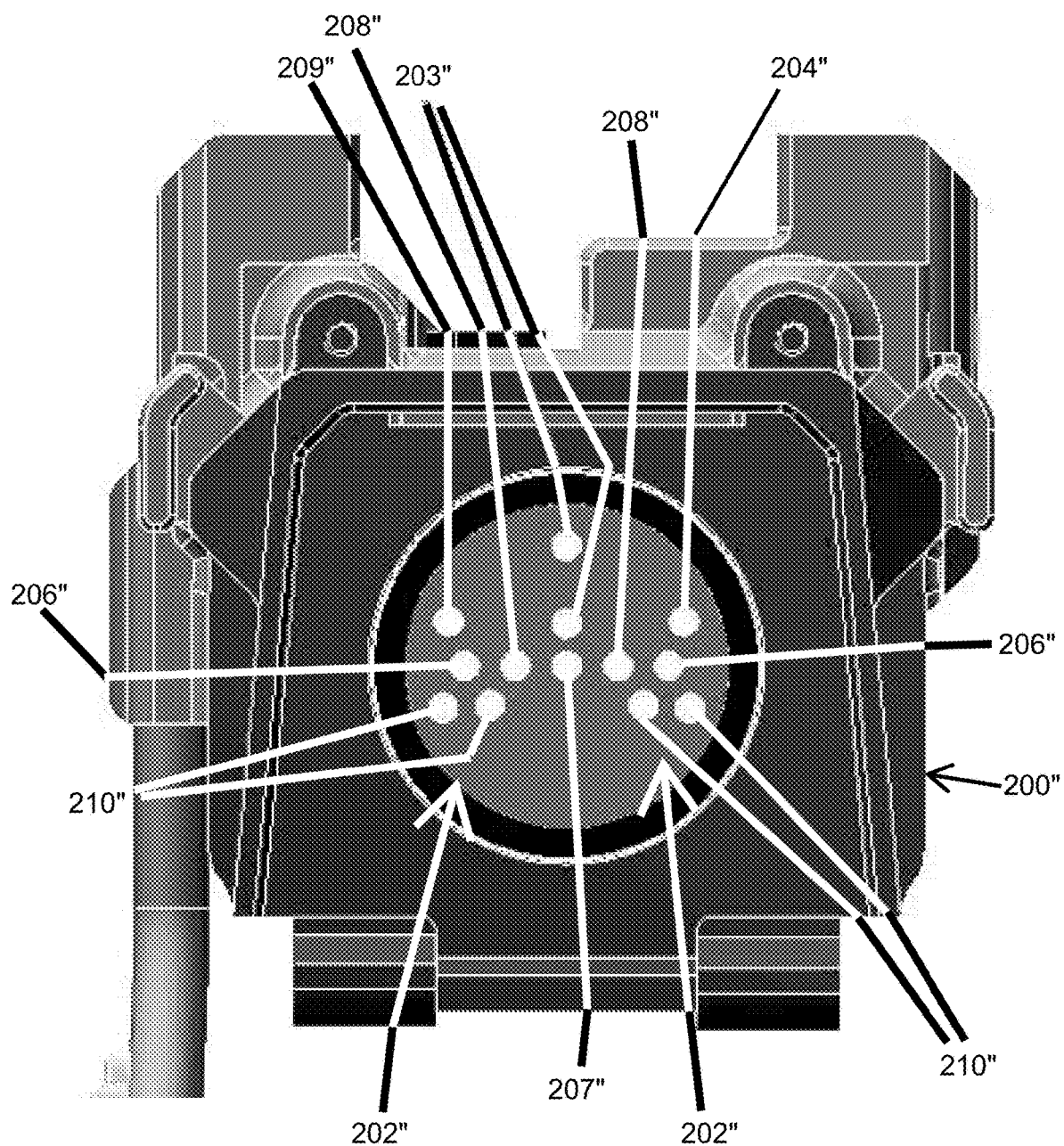
FIG. 13 is bottom view of a carriage assembly portion of the helmet mount assembly appearing in FIG. 11.

Referring now to FIGS. 11-13, there appears a helmet mount assembly 300 for positioning an accessory device, such as a viewing device or camera. For brevity, the embodiments herein will be described primarily by way of reference to a viewing device, such as a night vision goggle, as the accessory device, but other devices as noted above, such as a camera or near-eye display, are equally applicable to each of the embodiments, and are incorporated into descriptions thereof by reference. The helmet mount assembly 300 includes an interface portion 200' which engages the shroud 600.

A first high speed data interface portion 330 includes a plurality of high speed pins 210' and associated shield and drain pins, which engage respective high speed contact pads 110' and associated shield and drain pads on the second high speed data interface portion 610. A sealing ring 332 engages a complementary sealing area 632 on the interface area 100' to seal the high speed interface against resistance or environmental contamination. Power and ground pins 208' and 206', respectively, engage the respective, aligned power and ground pads 108' and 106', respectively.

A vertical adjusting arm 340 is attached to the interface assembly 200' to provide a vertical adjustment for aligning a viewing device with the eyes of the user. Horizontal pivoting arms 350 are pivotally attached to vertical adjusting arm 340, pivotable between a viewing or operable position and a stowed position. The arms 350 pivot about a power cylinder 360. A sliding carriage 370 provides a fore and aft adjustment of an attached viewing device relative to the eye of the user.

The carriage assembly 370 includes a hot shoe receiver 200", which includes a plurality of pins as follows: optical interface terminal 201", high speed contact pins 210", low speed contact pins 203", high speed drain pins 204", RF contact points 205", ground pins 206", power drains 207", power pins 208", and shield pin 209". The hot shoe receiver 200" may be configured as described above by way of reference to the hot shoe receptacle 215, except that the optical terminals and RF interface are omitted.

An accessory device 400, such as a viewing device, configured for use with the helmet mount assembly 300 includes a hot shoe 100" with contact pads for coupling with the contact pins of hot shoe receiver 200". Optical interface terminal 201" on the hot shoe receiver 200" is in optical communication with optical interface terminal 101" on the hot shoe 100". Low speed contact pins 203" on the hot shoe receiver 200" are operably aligned with the low speed contact pads 103" on the hoe shoe 100". Drain pin 204" on the hot shoe receiver 200" is configured for high speed conducting with high speed drain pad 104" on the hot shoe 100". RF contact points 205" on the hot shoe receiver 200" are operably aligned to RF contacts 105" on the hot shoe 100". Power ground pins 206" on the hot shoe receiver 200" are operably aligned with power ground pads 106" on the hot shoe 100". Power drains 207" on the hot shoe receiver 200" are operably aligned with drain pads 107" on the hot shoe 100". Power pins 208" on the hot shoe receiver 200" are operably aligned with power pads 108" on the hot shoe 100". Shield pin 209" on the hot shoe receptacle 215" is operably connected to shield pad 109 on the hot shoe 100".

In certain embodiments (not illustrated), the hot shoe 100" of the accessory device 400 is configured to directly engage with a hot shoe receiver 200" on a helmet 500 or on a shroud assembly 600 on a helmet 500. It will be recognized that the arrangement of the hot shoe 100" and the hot shoe receiver 200" may also be reversed.

Figure 18:
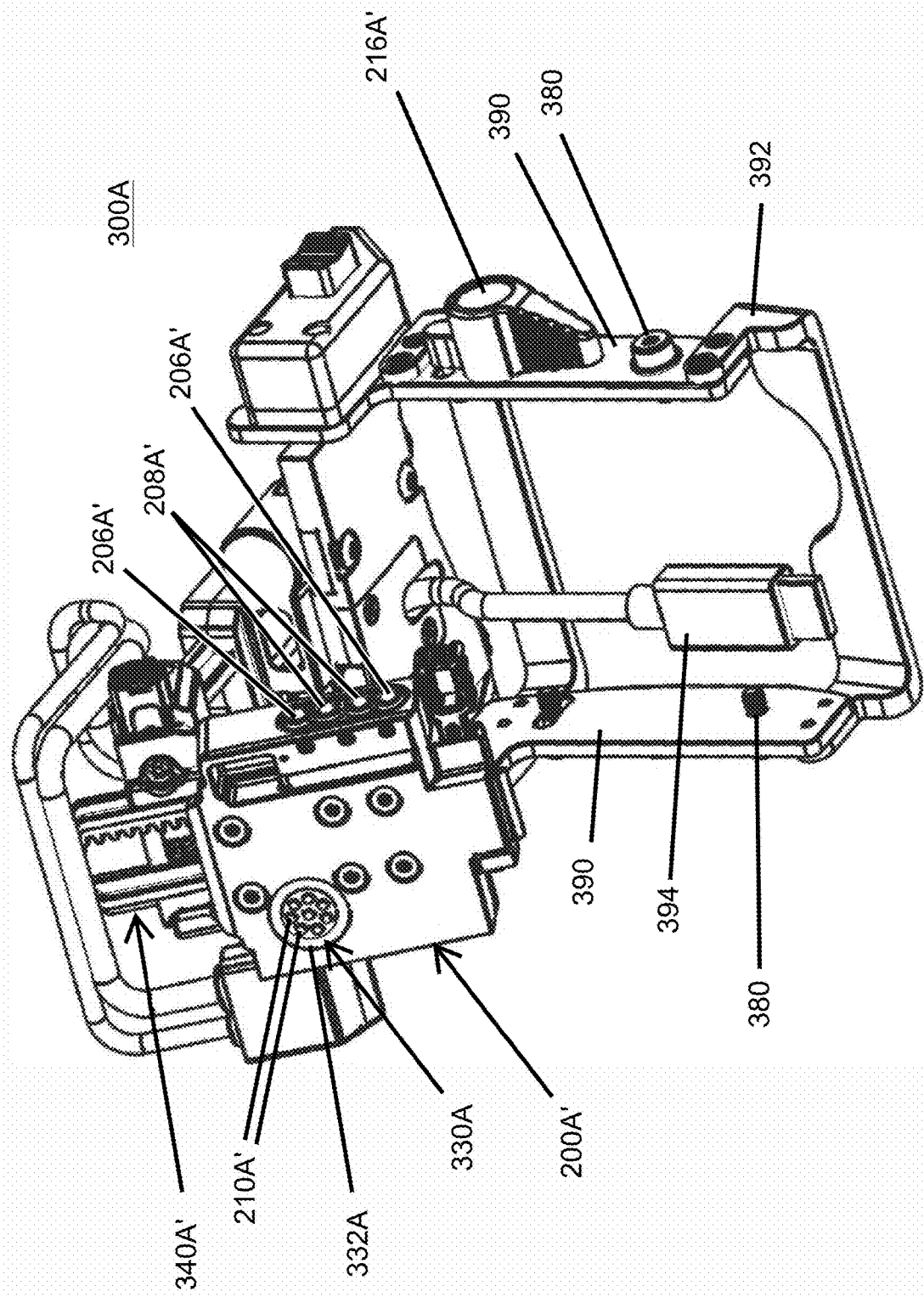
FIG. 18 is an isometric view, taken generally from the rear and left side, of a helmet mount assembly for positioning in front of the eyes of a user a viewing device that has a hot shoe interface portion in accordance with a second embodiment this disclosure.
Figure 19:
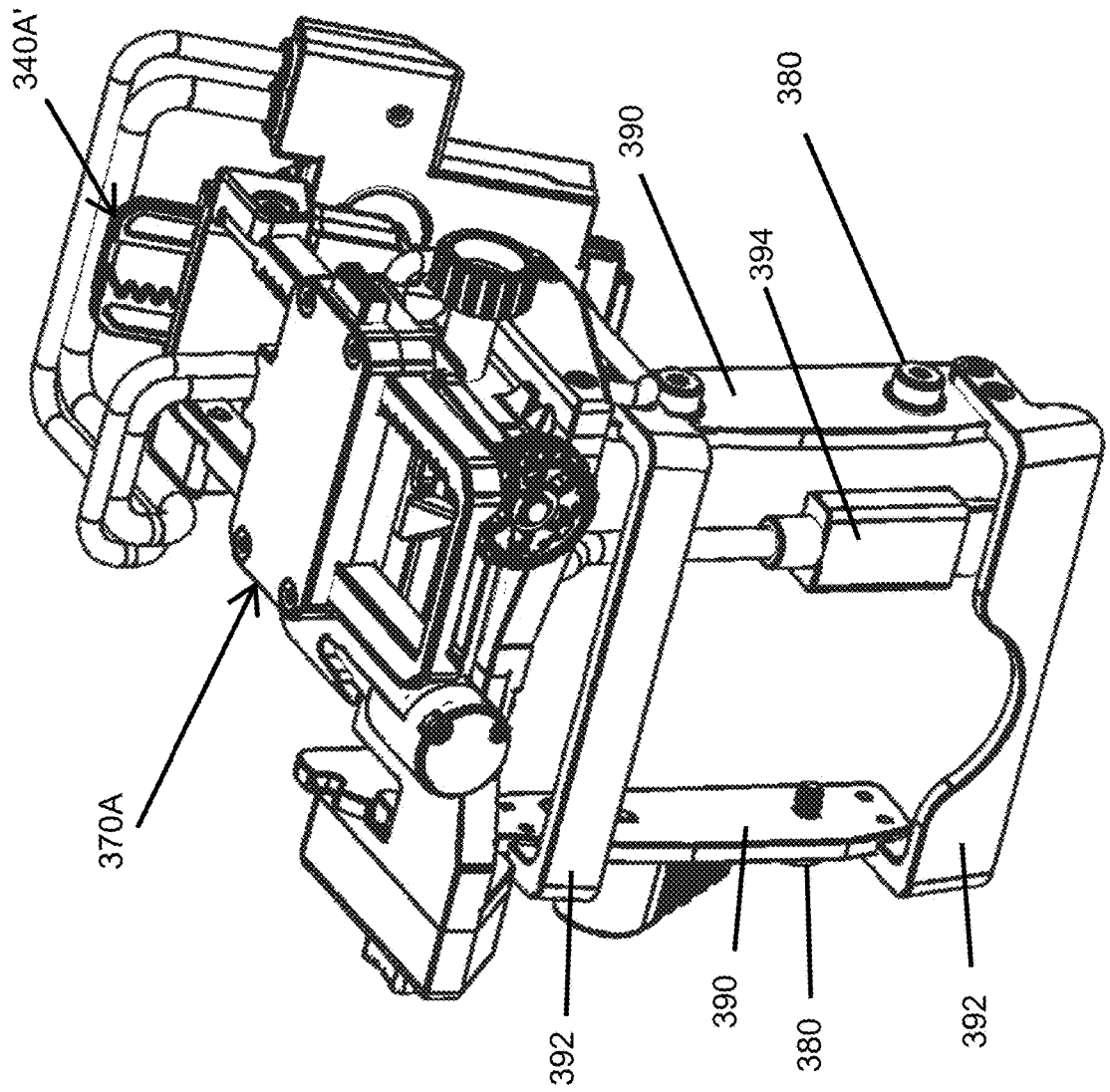
FIG. 19 is an isometric view, taken generally from the front and right side, of the helmet mount assembly for positioning in front of the eyes of a user a viewing device appearing in FIG. 18.

Referring now to FIGS. 18 and 19, there appears a helmet mount assembly 300A for positioning an accessory device (not shown), such as a viewing device or camera. For brevity, the embodiments herein will be described primarily by way of reference to a camera, but other devices as noted above, such as a viewing device, e.g., night vision goggles or near-eye display, are equally applicable to each of the embodiments, and are incorporated into descriptions thereof by reference. The helmet mount assembly 300A includes an interface portion 200A' which engages the shroud 600.

A first high speed data interface portion 330A includes a plurality of high speed pins 210A' and associated shield and drain pins, which engage corresponding high speed contact pads 110' and associated shield and drain pads on the second high speed data interface portion 610. A sealing ring 332A engages a complementary sealing area 632 on the interface area 100' to seal the high speed interface against resistance or environmental contamination. Power and ground pins 208A' and 206A', respectively, engage the corresponding power and ground pads 108' and 106', respectively.

A vertical adjusting arm 340A is attached to the interface assembly 200A' to provide a vertical adjustment for aligning a viewing device with the eyes of the user. Horizontal pivoting arms 350A are pivotally attached to vertical adjusting arm 340A, pivotable between a viewing or operable position and a stowed position. A sliding carriage 370A provides a fore and aft adjustment of an attached viewing device relative to the eye of the user.

The mounting assembly 300A includes a frame with a pair of vertical pivoting arms 390 for further aligning a viewing device or camera with the eyes of the user and a pair of horizontal fixed arms 392. In certain embodiments, the vertical frame arms 390 are configured to receive threaded fasteners 380 for retaining the camera or viewing device. The mounting assembly also includes a release 216A allows for release and adjustment of the vertical frame arms 390. In the illustrated embodiment, the helmet mount assembly 300A includes a data port or connector 394, such as a Universal Serial Bus (USB) port or connector, for mating with a corresponding connector or port of the camera. In certain embodiments, the data port or connector 394 is a Type-C USB connector (USB-C). In certain alternative embodiments, the camera is configured for wireless communication with the helmet, a computer, or computer-based information handling system.

The invention has been described with reference to the preferred embodiment. Modifications and alterations will occur to others upon a reading and understanding of the preceding detailed description. It is intended that the invention be construed as including all such modifications and alterations insofar as they come within the scope of the appended claims and equivalents thereof

What is claimed is:

1. An interface system for a helmet mounting system, comprising:
    a helmet strap assembly (700) including a strap (702);
    a helmet shroud (600) disposed at a first end of the helmet strap assembly (700), the helmet shroud (600) including a shroud interface assembly (100'), the shroud interface assembly being configured to mate with a first hot shoe (200') of a helmet mount assembly (300);
    the shroud interface assembly (100') comprising a high speed data interface (610) including a first plurality of high speed contacts (110') which are configured to be electrically coupled to a second plurality of high speed contacts (210') on the first hot shoe (200') when the shroud interface assembly (610) is coupled with the first hot shoe (200');
    a battery mount assembly (800) comprising a second hot shoe portion (100) disposed at a second end of the helmet strap assembly (700) opposite the first end, the second hot shoe portion (100) being configured to mate with a hot shoe receiver (200) of a battery pack (900); and
    the second hot shoe portion (100) comprising a high speed data interface including a third plurality of high speed contacts (110) which are configured to be electrically coupled to a fourth plurality of high speed contacts (210) on the hot shoe receiver (200) of the battery pack (900) when the second hot shoe portion (100) is coupled with the hot shoe receiver (200) of a battery pack (900).

2. The hot shoe interface system of claim 1, wherein the helmet strap assembly (700) is configured to be run over an exterior surface of a helmet (500).

3. The hot shoe interface system of claim 1, wherein the first plurality of high speed contacts (110') are contact pads and the second plurality of high speed contacts (210') are electrically conductive pins.

4. The hot shoe interface system of claim 1, wherein each high speed contact of the first plurality of high speed contacts (110') is electrically coupled to a corresponding one of the high speed contacts of the third plurality of high speed contacts (110) by a respective conductor (217) of a twisted pair (218) of conductors passing within the strap (702).

5. The hot shoe interface system of claim 4, wherein each twisted pair (218) of conductors is a twisted pair differential cable configured to provide 90 ohms of impedance.

6. The hot shoe interface system of claim 1, wherein the shroud interface assembly (610) further comprises a power interface (620) including a first set of power contacts (108') and ground contacts (106').

7. The hot shoe interface system of claim 6, further comprising:
    the helmet mount assembly (300) wherein the helmet mount assembly comprises the first hot shoe (200');
    the first hot shoe (200') including a high speed data interface portion (330) including the second plurality of high speed contacts (210') and a power connector portion including a second set of power contacts (208') and ground contacts (206') which engage the first set of power contacts (108') and ground contacts (106'), respectively.

8. The hot shoe interface system of claim 7, wherein the shroud interface assembly (610) further includes an optical interface portion including a plurality of optical terminals (101').

9. The hot shoe interface system of claim 7, wherein the helmet mount assembly (300) further comprises a receptacle (200") including a high speed data interface portion including the plurality of high speed contacts (210"), the receptacle configured to mate with a viewing device (400).

10. The hot shoe interface system of claim 9, wherein the receptacle (200") is configured to receive a viewing device (400) selected from the group consisting of a night vision device, camera, and near-eye display.

11. The hot shoe interface system of claim 7, wherein the helmet mount assembly (300) is pivotable between a first operable position wherein the viewing device is positioned in front of an eye of a user and a the operable position and a second stowed position wherein the viewing device is positioned out of a line of sight of the user.

12. The hot shoe interface system of claim 7, wherein the helmet mount assembly (300) further comprises a connector (394) configured for operable connection with an accessory device.

13. The hot shoe interface system of claim 12, wherein the connector (394) is a Type-C USB connector.

14. The hot shoe interface system of claim 1, further comprising the battery pack (900), the battery pack including the hot shoe receiver (200).

15. The hot shoe interface system of claim 1, further comprising an RF antenna (640) electrically coupled to an RF interface (105) on the second hot shoe portion (100).

16. The hot shoe interface system of claim 15, wherein the RF interface (105) is a coaxial RF interface.

* * * * *